US011798240B2

(12) United States Patent
Szczerba et al.

(10) Patent No.: US 11,798,240 B2
(45) Date of Patent: Oct. 24, 2023

(54) SYSTEM AND METHOD FOR SOCIAL NETWORKING USING AN AUGMENTED REALITY DISPLAY

(71) Applicant: GM Global Technology Operations LLC, Detroit, MI (US)

(72) Inventors: Joseph F. Szczerba, Grand Blanc, MI (US); John P. Weiss, Shelby Township, MI (US); Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 85 days.

(21) Appl. No.: 17/703,241

(22) Filed: Mar. 24, 2022

(65) Prior Publication Data

US 2023/0306692 A1  Sep. 28, 2023

(51) Int. Cl.
| | |
|---|---|
| *G06T 19/00* | (2011.01) |
| *G06Q 50/30* | (2012.01) |
| *G06Q 50/00* | (2012.01) |
| *G02B 27/01* | (2006.01) |

(52) U.S. Cl.
CPC ............ *G06T 19/006* (2013.01); *G02B 27/01* (2013.01); *G06Q 50/01* (2013.01); *G06Q 50/30* (2013.01)

(58) Field of Classification Search
CPC ...... G06T 19/006; G02B 27/01; G06Q 50/01; G06Q 50/30
See application file for complete search history.

(56) References Cited

U.S. PATENT DOCUMENTS

| | | | | |
|---|---|---|---|---|
| 9,645,221 | B1 * | 5/2017 | Heizer | G06Q 30/0255 |
| 10,281,721 | B2 * | 5/2019 | Bhalla | B60W 40/09 |
| 10,532,697 | B2 * | 1/2020 | Rakshit | G06T 19/006 |
| 11,430,211 | B1 * | 8/2022 | Tiutiunnik | H04L 51/10 |
| 2008/0109888 | A1 * | 5/2008 | Ullah | H04L 63/08 726/7 |
| 2014/0328521 | A1 * | 11/2014 | Colangelo | G06Q 10/10 382/118 |
| 2015/0317683 | A1 * | 11/2015 | Yerli | G06Q 30/0261 705/14.58 |

(Continued)

FOREIGN PATENT DOCUMENTS

| | | | | | |
|---|---|---|---|---|---|
| CN | 115668030 | A * | 1/2023 | ......... | G02B 27/0101 |
| EP | 2638527 | B1 * | 8/2019 | ........... | G06T 19/006 |

(Continued)

*Primary Examiner* — Chante E Harrison
(74) *Attorney, Agent, or Firm* — Vivacqua Crane PLLC

(57) ABSTRACT

A method for social networking using a multi-focal plane augmented reality display of a host vehicle includes receiving social-networking data from a remote device. The social-networking data includes information about at least one social interest of a remote user of the remote device. The remote device is located within a viewable area of a vehicle user of the host vehicle. The method further includes determining whether at least one social interest of the remote user matches a vehicle-user social interest of the vehicle user of the host vehicle using the social-networking data. The method further includes transmitting a command signal to the multi-focal plane augmented reality display of the host vehicle to display a virtual image on the multi-focal plane augmented reality display. The virtual image is indicative of the vehicle.

16 Claims, 5 Drawing Sheets

(56) References Cited

U.S. PATENT DOCUMENTS

| | | | |
|---|---|---|---|
| 2017/0034659 A1* | 2/2017 | Shnitzer | G06F 3/04842 |
| 2019/0320061 A1* | 10/2019 | Salandy-Defour | H04W 4/025 |
| 2021/0058758 A1* | 2/2021 | Carter | G06F 3/014 |
| 2022/0122191 A1* | 4/2022 | Boksha | G06Q 50/01 |

FOREIGN PATENT DOCUMENTS

| | | | | |
|---|---|---|---|---|
| WO | WO-2019200385 A1 * | 10/2019 | | G06Q 50/01 |
| WO | WO-2021067881 A1 * | 4/2021 | | H04N 21/41422 |
| WO | WO-2021132555 A1 * | 7/2021 | | |
| WO | WO-2022130011 A1 * | 6/2022 | | |
| WO | WO-2022230995 A1 * | 11/2022 | | |
| WO | WO-2023048213 A1 * | 3/2023 | | |

\* cited by examiner

SYSTEM AND METHOD FOR SOCIAL NETWORKING USING AN AUGMENTED REALITY DISPLAY

INTRODUCTION

The present disclosure relates to a system and method for social networking using a multi-focal plane augmented reality display.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicles include displays to provide information to a vehicle user. However, these displays do not necessarily present information relating to social networking. In the present disclosure, the term "social networking" means the use of internet-based social media platforms to stay connected with friends, family, acquaintances, or peers or to find new connections having common social interests. Providing social networking information may help the vehicle user connect with other people that have similar interests. In the present disclosure, the term "social networking information" means information about social networking. It is desirable to develop a system and a method for social networking using a multi-focal plane augmented reality display of a vehicle based on real-time vehicle positioning.

SUMMARY

The present disclosure describes a system and method for presenting interest-based social networking information to the vehicle user on an augmented reality display, such as a head-up display. Based on the personal settings of the vehicle user, the augmented reality display presents the vehicle user with the location of people with similar interests or attending local events. Contact information may be presented on a vehicle display.

In an aspect of the present disclosure, a method for social networking using a multi-focal plane augmented reality display of a host vehicle includes receiving social-networking data from a remote device. The social-networking data includes information about at least one social interest of a remote user of the remote device. The remote device is located within a viewable area of a vehicle user of the host vehicle. The viewable area is an area that is visible by the vehicle user through a windshield of the host vehicle, in front of the host vehicle, and within a predetermined viewable distance from the host vehicle. The method further includes determining whether at least one social interest of the remote user matches a vehicle-user social interest of the vehicle user of the host vehicle using the social-networking data. Further, the method includes, in response to determining that at least one social interest of the remote user matches the vehicle-user social interest of the vehicle user, transmitting a command signal to the multi-focal plane augmented reality display of the host vehicle to display a virtual image on the multi-focal plane augmented reality display. The virtual image is indicative of the vehicle-user social interest that matches at least one social interest of the remote user. The method described in this paragraph improves vehicle technology by presenting interest-based social networking information to the vehicle user on an augmented reality display, such as a head-up display, thereby allowing the vehicle user to locate of people with similar interests or attending the same local events.

In an aspect of the present disclosure, the method further includes determining a location of the host vehicle relative to the remote user having at least one social interest that matches the vehicle-user social interest.

In an aspect of the present disclosure, the method further includes determining a type of the virtual image to be displayed by the multi-focal plane augmented reality display based on at least one social interest of the remote user that matches the vehicle-user social interest.

In an aspect of the present disclosure, the method includes determining a location of eyes of the vehicle user of the host vehicle and determining a location of the virtual image based on the location of the eyes of the vehicle user. Transmitting the command signal to the multi-focal plane augmented reality display includes commanding the multi-focal plane augmented reality display of the host vehicle to display the virtual image at the location determined based on the location of the eyes of the vehicle user.

In an aspect of the present disclosure, the method includes determining a location of eyes of the vehicle user of the host vehicle, determining a location of a head of the vehicle user of the host vehicle, and determining a location of the virtual image based on the location of the eyes of the vehicle user and the location of the head of the host vehicle. Transmitting the command signal to the multi-focal plane augmented reality display includes commanding the multi-focal plane augmented reality display of the host vehicle to display the virtual image at the location determined based on the location of the eyes and the location of the head of the vehicle user.

In an aspect of the present disclosure, the multi-focal plane augmented reality display is configured as a head-up display, and the virtual image is displayed on the windshield of the host vehicle.

In an aspect of the present disclosure, the host vehicle includes an information display. The method further includes displaying contact information for the remote user with at least one social interest of the remote user that matches the vehicle-user social interest.

In an aspect of the present disclosure, the method further includes, after transmitting the command signal to the multi-focal plane augmented reality display of the host vehicle to display the virtual image on the multi-focal plane augmented reality display, determining whether the remote user with at least one social interest that matches the vehicle-user social interest is still within the viewable area of the vehicle user.

In an aspect of the present disclosure, determining whether the remote user with at least one social interest that matches the vehicle-user social interest is still within the viewable area of the vehicle user includes: determining whether the remote device of the remote user with at least one social interest that matches the vehicle-user social interest is within the predetermined viewable distance from the host vehicle; and determining whether the remote device of the remote user with at least one social interest that matches the vehicle-user social interest is in the area in front of the host vehicle.

In an aspect of the present disclosure, the method further includes, in response to determining that the remote device of the remote user with at least one social interest that matches the vehicle-user social interest is not within the predetermined viewable distance from the host vehicle or that the remote device of the remote user with at least one social interest that matches the vehicle-user social interest is not in the area in front of the host vehicle, determining that the remote user with at least one social interest that matches the vehicle-user social interest is not within the viewable area of the vehicle user. The method further includes, in response to determining that the remote user with at least one social interest that matches the vehicle-user social interest is not within the viewable area of the vehicle user, transmitting an off signal to the multi-focal plane augmented reality display to discontinue showing the virtual image on the multi-focal plane augmented reality display.

The present disclosure also describes a system for social networking in a of a host vehicle. In an aspect of the present disclosure, the system includes a transceiver configured to receive social-networking data from a remote device. The social-networking data includes information about at least one social interest of a remote user of the remote device. The remote device is located in a viewable area of a vehicle user of the host vehicle, and the viewable area is an area that is visible by the vehicle user through a windshield of the host vehicle, in front of the host vehicle, and within a predetermined viewable distance from the host vehicle. The system further includes a multi-focal plane augmented reality display configured to display a virtual image and a controller in communication with the transceiver and the multi-focal plane augmented reality display. The controller is configured to: receive the social-networking data from the remote device; determine whether at least one social interest matches a vehicle-user social interest of the vehicle user of the host vehicle; and in response to determining that at least one social interest of the remote device matches the vehicle-user social interest of the vehicle user, transmit a command signal to the multi-focal plane augmented reality display of the host vehicle to display a virtual image on the multi-focal plane augmented reality display. The virtual image is indicative of the vehicle-user social interest of the remote user that matches at least one social interest of the remote device. The system described in this paragraph improves vehicle technology by presenting interest-based social networking information to the vehicle user on an augmented reality display, such as a head-up display, thereby allowing the vehicle user to locate of people with similar interests or attending the same local events.

In an aspect of the present disclosure, the system further includes a plurality of sensors in communication with the controller. The controller is further configured to determine a location of the host vehicle relative to the remote device having at least one social interest that matches the vehicle-user social interest based on at least one signal received from the plurality of sensors.

In an aspect of the present disclosure, the controller is configured to determine a type of the virtual image to be displayed by the multi-focal plane augmented reality display based on at least one social interest that matches the vehicle-user social interest.

In an aspect of the present disclosure, the plurality of sensors includes a user tracker in communication with the controller. The controller is configured to determine a location of eyes of the vehicle user of the host vehicle based on an input from the user tracker and determine a location of the virtual image based on the location of the eyes of the vehicle user. The controller is further configured to command the multi-focal plane augmented reality display of the host vehicle to display the virtual image at the location determined based on the location of the eyes of the vehicle user.

In an aspect of the present disclosure, the sensors include a user tracker in communication with the controller. The controller is configured to: determine a location of eyes of the vehicle user of the host vehicle based on an input from the user tracker; determine a location of a head of the vehicle user of the host vehicle based on the input from the user tracker; determine a location of the virtual image based on the location of the eyes of the vehicle user and the location of the head of the host vehicle; and command the multi-focal plane augmented reality display of the host vehicle to display the virtual image at the location determined based on the location of the eyes and the location of the head of the vehicle user.

In an aspect of the present disclosure, the multi-focal plane augmented reality display is configured as a head-up display. The controller is configured to command the multi-focal plane augmented reality display to display the virtual image on the windshield of the host vehicle.

In an aspect of the present disclosure, the host vehicle includes an information display in communication with the controller. The controller is further configured to command the information display to display contact information for the remote user with at least one social interest that matches the vehicle-user social interest.

In an aspect of the present disclosure, the controller is configured to determine whether the remote user with at least one social interest that matches the vehicle-user social interest is still within the viewable area of the vehicle user after transmitting the command signal to the multi-focal plane augmented reality display of the host vehicle to display the virtual image on the multi-focal plane augmented reality display.

In an aspect of the present disclosure, the controller is configured to determine whether the remote user with at least one social interest that matches the vehicle-user social interest is still within the viewable area of the vehicle user by: determining whether the remote device of the remote user with at least one social interest that matches the vehicle-user social interest is within the predetermined viewable distance from the host vehicle; and determining whether the remote device of the remote user with at least one social interest that matches the vehicle-user social interest is in the area in front of the host vehicle.

In an aspect of the present disclosure, the controller is configured to, in response to determining that the remote device of the remote user with at least one social interest that matches the vehicle-user social interest is not within the predetermined viewable distance from the host vehicle or that the remote device of the remote user with at least one social interest that matches the vehicle-user social interest is not in the area in front of the host vehicle, determine that the remote user with at least one social interest that matches the vehicle-user social interest is not within the viewable area of the vehicle user. The controller is configured to, in response to determining that the remote user with at least one social interest that matches the vehicle-user social interest is not within the viewable area of the vehicle user, transmit an off signal to the multi-focal plane augmented reality display to discontinue showing the virtual image on the multi-focal plane augmented reality display.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
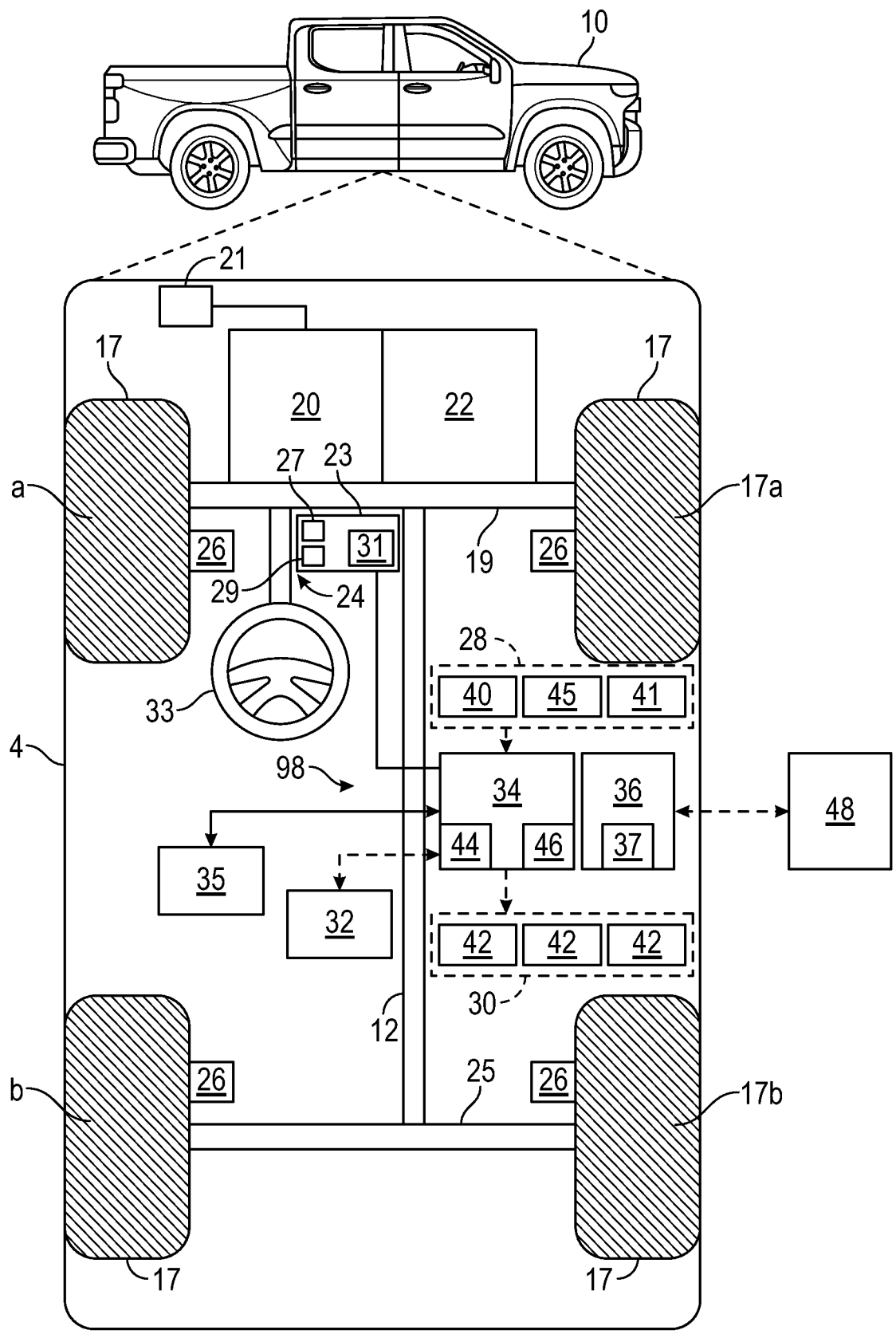
FIG. 1 is a block diagram depicting an embodiment of a vehicle including a system for social networking using a multi-focal plane augmented reality display.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a host vehicle 10 generally includes a chassis 12, a body 14, front and rear wheels 17 and may be referred to as a vehicle system. In the depicted embodiment, the host vehicle 10 includes two front wheels 17a and two rear wheels 17b. The body 14 is arranged on the chassis 12 and substantially encloses components of the host vehicle 10. The body 14 and the chassis 12 may jointly form a frame. The wheels 17 are each rotationally coupled to the chassis 12 near a respective corner of the body 14. The host vehicle 10 includes a front axle 19 coupled to the front wheels 17a and a rear axle 25 coupled to the rear wheels 17b.

In various embodiments, the host vehicle 10 may be an autonomous vehicle and a control system 98 is incorporated into the host vehicle 10. The control system 98 may be referred to as the system or the system for social networking using one or more displays 29, such as a multi-focal plane augmented reality display. The host vehicle 10 is, for example, a vehicle that is automatically controlled to carry passengers from one location to another. The host vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the host vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the host vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control. However, even if these systems are activated, the vehicle operator at the wheel must be driving and constantly supervising the automated features.

As shown, the host vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The host vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the host vehicle 10. The sensors 40 are in communication with the controller 34 and may include, but are not limited to, one or more radars, one or more light detection and ranging (lidar) sensors, one or more proximity sensors, one or more odometers, one or more ground penetrating radar (GPR) sensors, one or more steering angle sensors, one or more global positioning systems (GPS) transceivers 45, one or more tire pressure sensors, one or more cameras 41 (e.g., optical cameras and/or infrared cameras), one or more gyroscopes, one or more accelerometers, one or more inclinometers, one or more speed sensors, one or more ultrasonic sensors, one or more inertial measurement units (IMUs) and/or other sensors. Each sensor 40 is configured to generate a signal that is indicative of the sensed observable conditions of the exterior environment and/or the interior environment of the host vehicle 10. Because the sensor system 28 provides data to the controller 34, the sensor system 28 and its sensors 40 are considered sources of information (or simply sources).

The sensor system 28 includes one or more Global Navigation Satellite System (GNSS) transceivers 45 (e.g., Global Positioning System (GPS) transceivers) configured to detect and monitor the route data (i.e., route information). The GNSS transceiver 45 is configured to communicate with a GNSS to locate the position of the host vehicle 10 in the globe. The GNSS transceiver 45 is in electronic communication with the controller 34.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the host vehicle 10. In various embodiments, the data storage device 32 stores defined maps of the navigable environment. In various embodiments, the defined maps may be predefined by and obtained from a remote system. For example, the defined maps may be assembled by the remote system and communicated to the host vehicle 10 (wirelessly and/or in a wired manner) and stored in the data storage device 32. The data storage device 32 may be part of the controller 34, separate from the controller 34, or part of the controller 34 and part of a separate system.

The host vehicle 10 may further include one or more airbags 35 in communication with the controller 34 or another controller of the host vehicle 10. The airbag 35 includes an inflatable bladder and is configured to transition between a stowed configuration and a deployed configuration to cushion the effects of an external force applied to the host vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the host vehicle 10. The controller 34 of the host vehicle 10 may be referred to as a vehicle controller and may be programmed to execute a method 100 (FIG. 7) as described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the host vehicle 10, and generate control signals to the actuator system 30 to automatically control the components of the host vehicle 10 based on the logic, calculations, methods, and/or algorithms. Although a single controller 34 is shown in FIG. 1, embodiments of the host vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the host vehicle 10.

Figure 6:
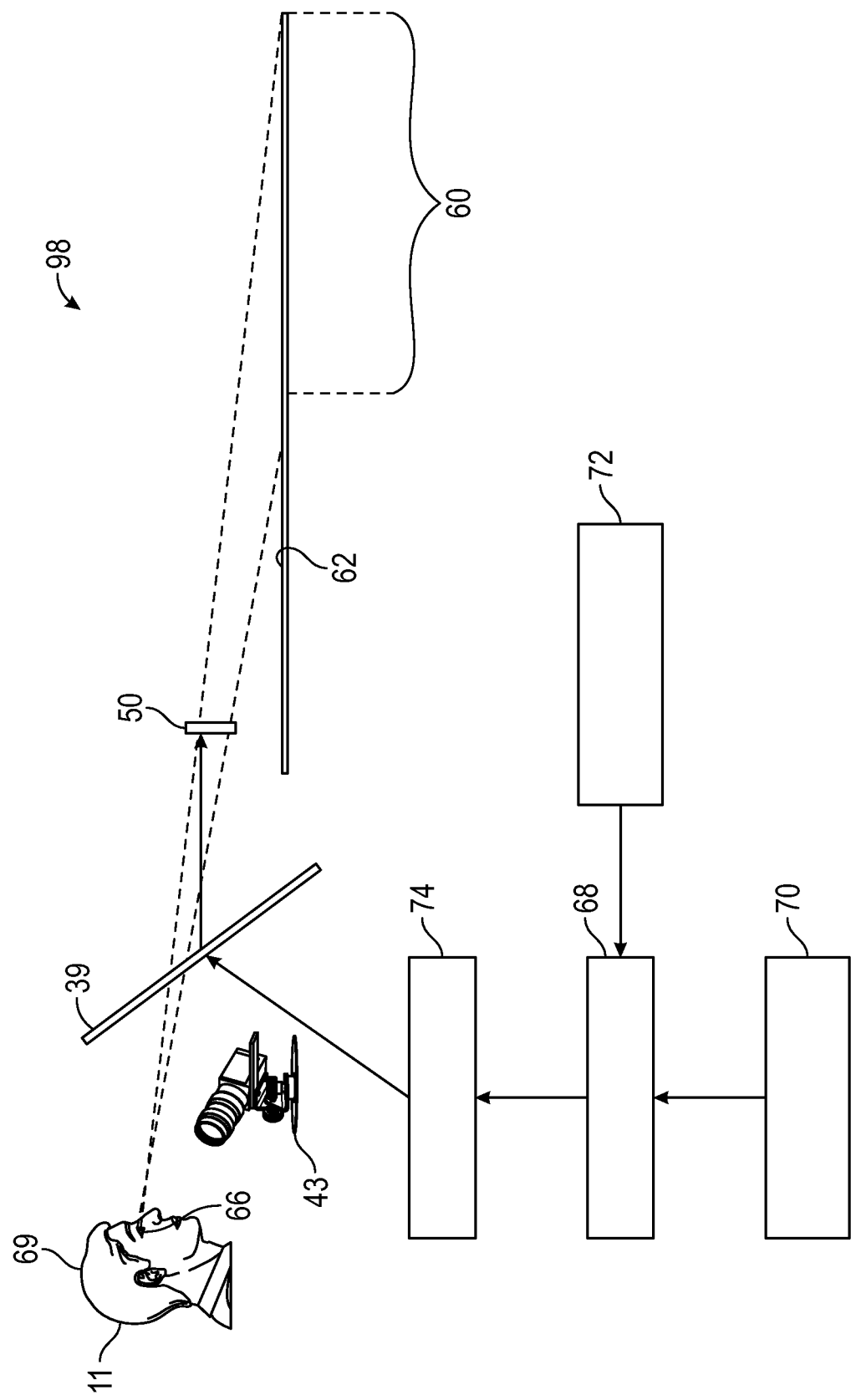
FIG. 6 is a schematic diagram of part of the system for social networking using a multi-focal plane augmented reality display of FIG. 1.

In various embodiments, one or more instructions of the controller 34 are embodied in the control system 98. The host vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the host vehicle 10. The user interface 23 is in electronic communication with the controller 34 and is configured to receive inputs by a user (e.g., a vehicle operator or a vehicle passenger). For example, the user interface 23 may include a touch screen and/or buttons configured to receive inputs from a vehicle user 11 (FIG. 6). Accordingly, the controller 34 is configured to receive inputs from the user via the user interface 23.

The host vehicle 10 may include one or more displays 29 configured to display information to the user (e.g., vehicle operator or passenger) and may be an augmented reality (AR) display. In the present disclosure, the term "AR display" means a display that presents information to users, while still allowing sight of the outside world. In certain embodiments, the display 29 may be configured as a head-up display (HUD), and/or an information cluster display. Accordingly, the display 29 may be an AR HUD or an AR information cluster display. In an AR HUD, images are projected on a windshield 39 (FIG. 6) of the host vehicle 10. In an AR information cluster display, the information cluster panel of the host vehicle 10 includes a screen that presents an image of the front of the host vehicle 10 captured by one or more cameras 41 (i.e., a forward image) and virtual images presented on that forward image. As discussed below, the display 29 may be a multi-focal plane AR display to facilitate manipulation (e.g., size, location, and type) of the virtual images. In certain embodiments, the host vehicle 10 includes a multi-focal plane augmented reality display 29a (FIG. 2) configured as a head-up display and an information display 29b (FIG. 3) configured as a center display.

The communication system 36 is in communication with the controller 34 and is configured to wirelessly communicate information to and from other remote devices 48, such as but not limited to, other vehicles ("V2V" communication), infrastructure ("V2I" communication), remote systems at a remote call center (e.g., ON-STAR by GENERAL MOTORS) and/or personal electronic devices, such as a mobile phone. In the present disclosure, the term "remote device" means a device configured to transmit one or more signals to the host vehicle 10 while not physically connected to the host vehicle 10. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the host vehicle 10 and another vehicle. Further, the communication system 36 is configured to wirelessly communicate information between the host vehicle 10 and infrastructure or other vehicles.

Figure 2:
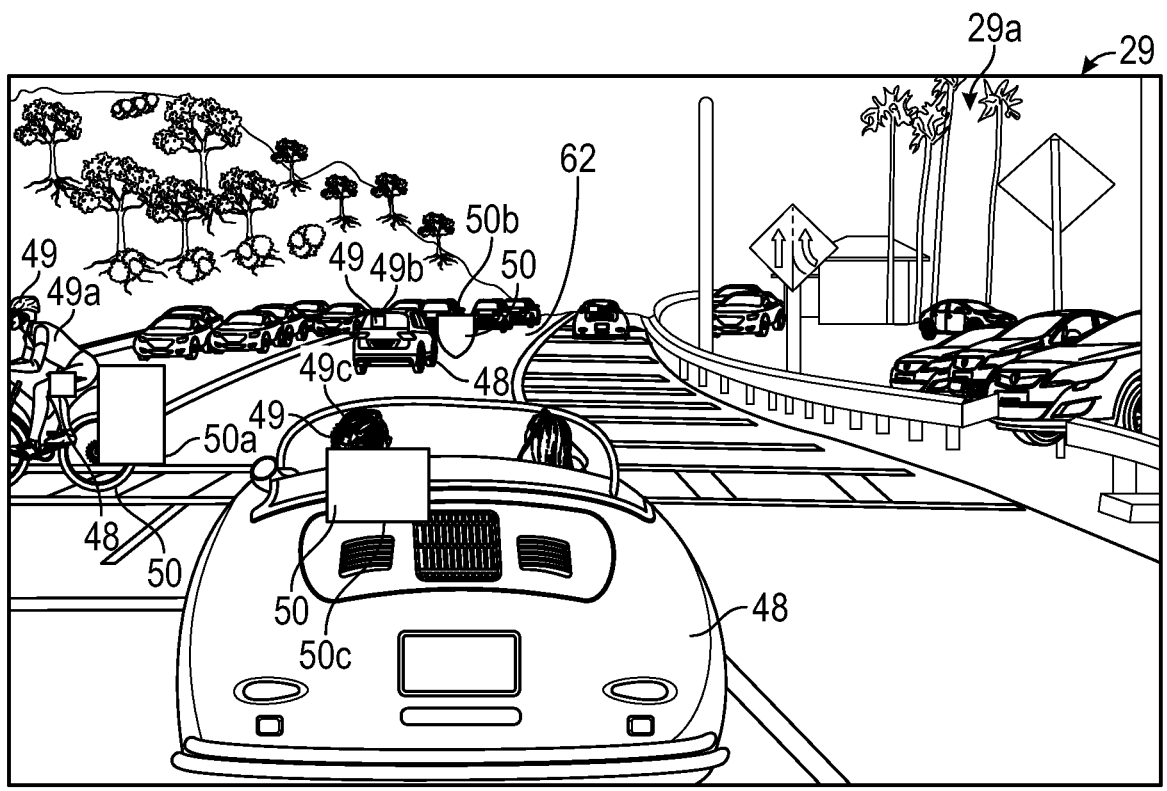
FIG. 2 is a schematic front view of the multi-focal plane augmented reality display of FIG. 1, wherein the multi-focal plane augmented reality display presents social networking information.
Figure 3:
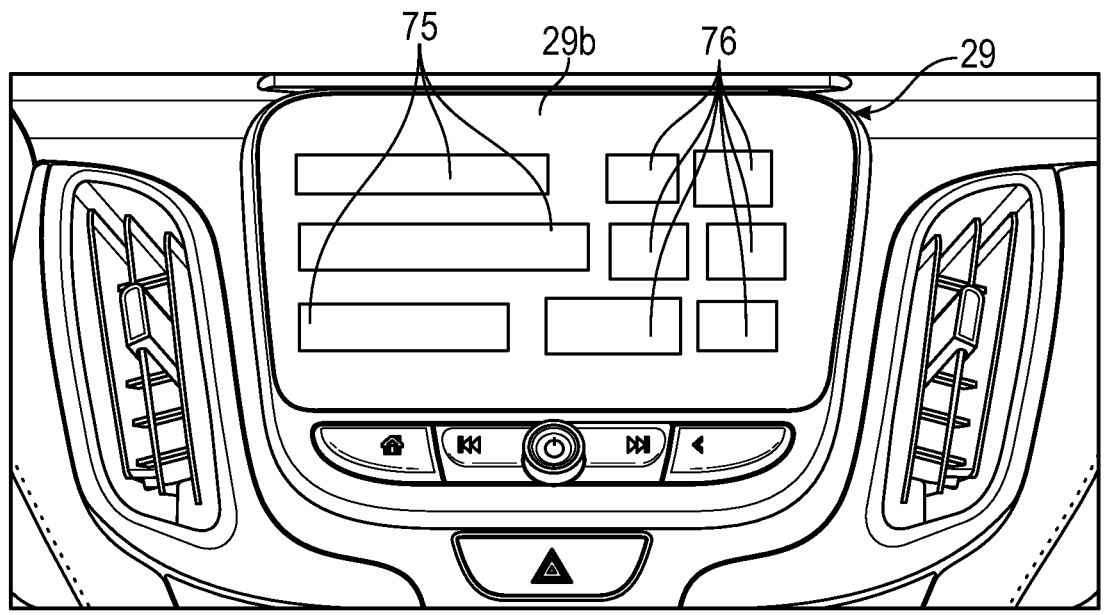
FIG. 3 is a schematic front view of an information display of the vehicle of FIG. 1, wherein the information display presents contact information of other people with similar social interests as the vehicle user of the vehicle of FIG. 1.

With reference to FIGS. 1, 2, and 3, the system 98 is configured to command the display 29, such as an AR HUD, an AR information cluster display and/or an information display, to present social networking information received from data received from other remote devices 48 through the communication system 36 (e.g., V2V communications), and/or eye-tracking data. In doing so, the display 29 shows the social networking information in a contextual manner by augmenting the road scene with conformal graphics. In the present disclosure, the term "conformal graphic" means synthetic generated content (i.e., a virtual image 50) presented as part of the outside world. Accordingly, the display 29 is a conformal display. In the present disclosure, the term "conformal display" means a display that has the ability to represent synthetically generated content (i.e., one or more virtual images 50) as part of the outside world.

In FIG. 2, the multi-focal plane augmented reality display 29a is configured as a head-up display (HUD) and presents virtual images 50 indicative of a social interest of remote users 49. In the present disclosure, the term "remote user" means a human that is located outside the host vehicle 10 and that is in possession of one or more remote devices 48. In the depicted example, the multi-focal plane augmented reality display 29a shows a first virtual image 50a adjacent to a first remote user 49a with a first social interest, such as attending a local event (e.g., DETROIT TIGERS game), a second virtual image 50b adjacent to a second remote user 49b with a second social interest (e.g., HARVARD alumni), and a third virtual image 50c adjacent to a third remote user 49c with a third social interest (e.g., PINK FLOYD fan). While the second remote user 49b and the third remote user 49c are operating a motor vehicle, the first remote user 49a is riding a bicycle. It is envisioned, however, that the remote user 49 may be operating a vehicle or walking. Each virtual image 50 includes text, logo, slogan (e.g., DETROIT TIGERS logo, PINK FLOYD brand, and/or HARVARD logo), or other information indicative of the social interest of the particular remote user 49. As discussed above, the virtual images 50 may be displayed on an information cluster display instead of (or in addition to) the multi-focal plane augmented reality display 29a. Regardless of the type of display 29 used to show the virtual images 50, the display 29 presents virtual images 50 based on social-networking data received from remote devices located within a viewable area of a vehicle user 11 (FIG. 6) of the host vehicle 10. In the present disclosure, the term "viewable area" means an area that is: (1) visible by the vehicle user 11 (FIG. 6) through a windshield 39 (FIG. 6) of the host vehicle 10 (FIG. 1); (2) in front of the host vehicle 10, and (3) within a predetermined viewable distance from the host vehicle 10. The predetermined viewable distance may be determined by testing the host vehicle 10. In some embodiments, the predetermined viewable distance is twenty feet from the host vehicle 10 to provide the maximum information possible to a vehicle user 11 with 20/20 vision. The multi-focal plane augmented reality display 29a may solely display virtual images 50 that are indicative of social interest of the remote users 49 that match the social interests of the vehicle user 11 of the host vehicle 10. The vehicle user 11 may input his or her social interests into the controller 34 through the user interface 23 before operating the host vehicle 10.

In FIG. 3, the information display 29b is configured as a center information display and presents contact information 76 associated with each remote user 49 identified in the multi-focal plane augmented reality display 29a as having the same social interest as the vehicle user 11. To this end, the display 29b shows remote-user information 75 and the contact information 76 of the particular remote user 49 next to the remote-user information 75. The contact information 76 may be the page of the remote user 49 in a particular Internet-based social media platform, such as FACEBOOK, TWITTER, INSTAGRAM, WHATSAPP, and/or TIKTOK. Instead or in addition to displaying the contact information 76 of the remote user 49, the display 29 may show a symbol that functions as a link to the page of the remote user 49. This symbol may be indicative of one or more Internet-based social media platforms, such as FACEBOOK, TWITTER, INSTAGRAM, WHATSAPP, and/or TIKTOK. The remote-user information 75 may include text identifying the remote user 49 having the same social interest as the vehicle user 11. For example, the remote-user information 75 may include text, such as "PINK FLOYD fan", "TIGER fan heading to the DODGER Stadium" and/or "HARVARD alumni '09".

Figure 4:
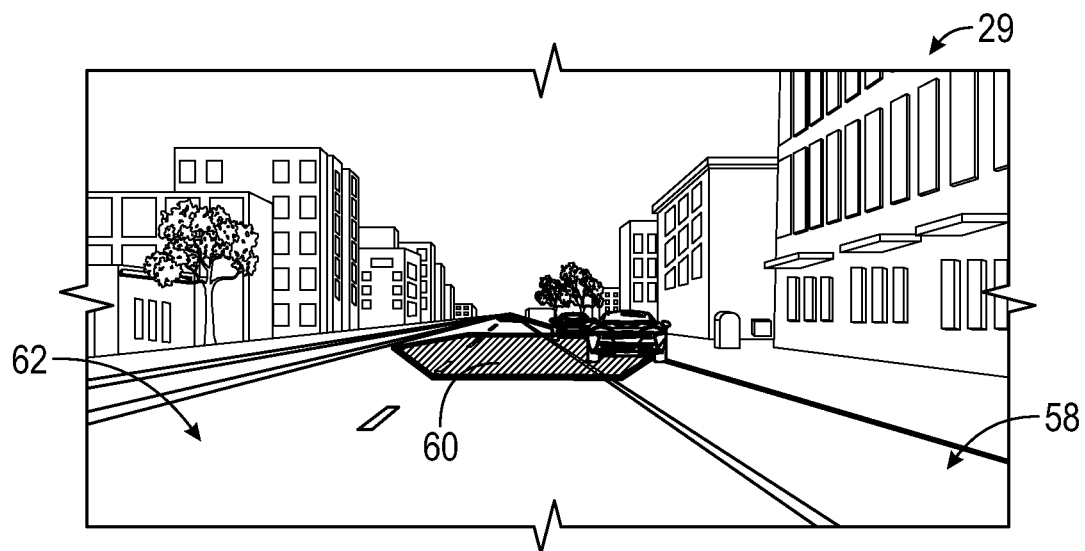
FIG. 4 is a schematic diagram of the second image plane of the multi-focal plane augmented reality display of FIG. 1.
Figure 5:
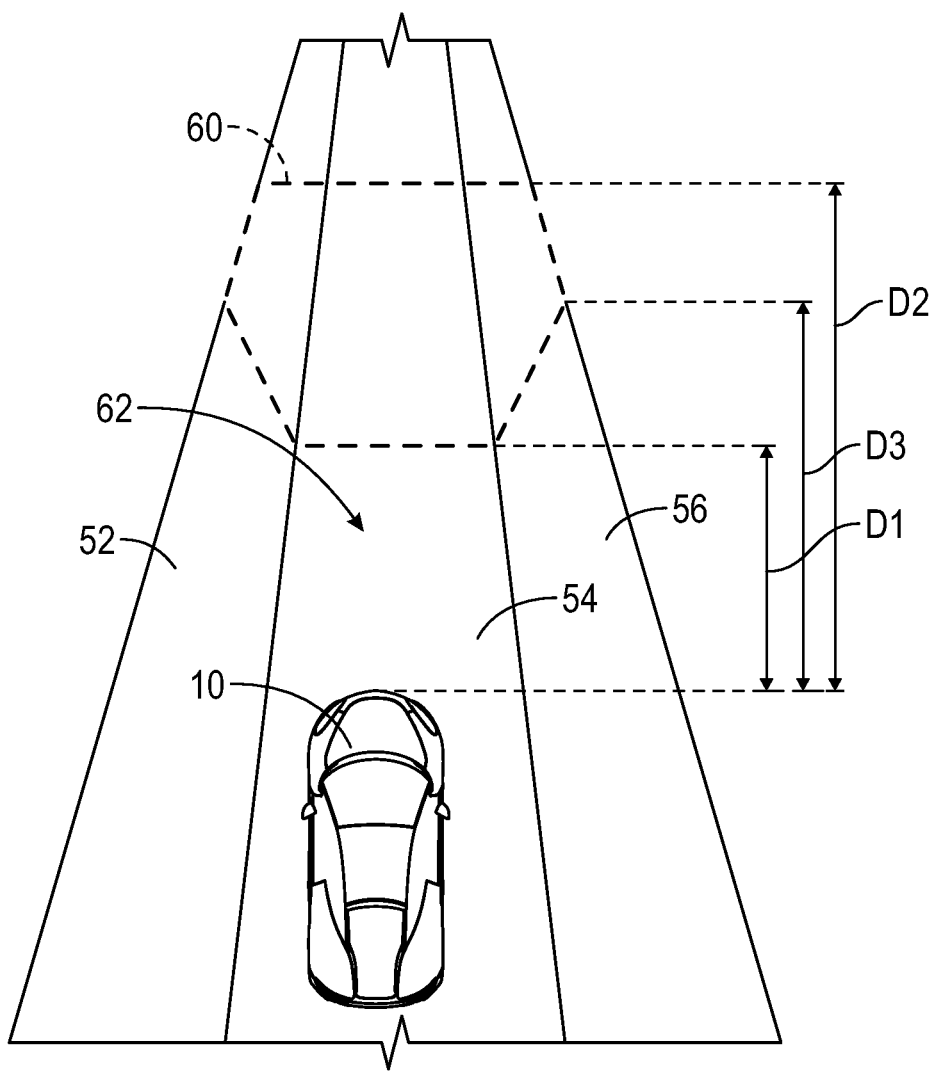
FIG. 5 is a schematic front view of the multi-focal plane augmented reality display of FIG. 1, highlighting the second image plane of the multi-focal plane augmented reality display of FIG. 1.

With reference to FIGS. 4 and 5, the display 29 may be a multi-focal plane AR display as mentioned above. In this case, the display 29 has a first image plane 58 and a second image plane 60. The first image plane 58 shows the view of the outside world, and the second image plane 60 is reserved for displaying the virtual images 50 (FIG. 2). The second image plane 60 spans multiple lanes and the virtual images 50 appear at a location farther on the roadway surface 62 relative to the first image plane 58. For instance, as shown in FIG. 5, the second image plane 60 covers the left lane 52, the central lane 54, and the right lane 56. As a non-limiting example, in the central lane 54, the second image plane 60 starts at a first predetermined distance D1 (e.g., twenty-five meters) from the host vehicle 10 and ends at a second predetermined distance D2 (e.g., ninety meters) from the host vehicle 10. Regardless of the specific distances, the second predetermined distance D2 is greater than the first predetermined distance D1 to help the vehicle user 11 (FIG. 6) see the virtual images 50 (FIG. 3). In the left lane 52 and the right lane 56, the second image plane 60 is delimited by a sloped boundary that starts at the first predetermined distance D1 from the host vehicle 10 and ends at a third predetermined distance D3 (e.g., fifty meters) from the host vehicle 10. The third predetermined distance D3 is greater than the first predetermined distance D1 and less than the second predetermined distance D2 to help the vehicle user 11 (FIG. 6) see the virtual images 50 (FIG. 3). As used herein, the term "multi-focal plane AR display" means an AR display that presents images in more than one image plane, wherein the image planes are at different locations. It is desirable to use a multi-focal plane AR display in the presently disclosed system 98 to easily change the size, type, and/or location of the virtual images 50 with respect to the view of the outside world.

With reference to FIG. 6, the system 98 includes a user tracker 43 (e.g., eye tracker and/or head tracker) configured to track the position and movement of the eyes 66 or the head 69 of the vehicle user 11. In the depicted embodiment, the user tracker may be configured as one or more of cameras 41 of the host vehicle 10. As discussed above, the cameras 41 are considered sensors 40 of the host vehicle 10. As a sensor 40, the user tracker 43 is in communication with the controller 34, which includes a system manager 68. During operation of the system 98, the system manager 68 receives at least a first input 70 and a second input 72. The first input 70 is indicative of the position of the vehicle in space (i.e., the vehicle location in space), and the second input 72 is indicative of the vehicle user position in the host vehicle 10 (e.g., the position of the eyes and/or head of the user in the host vehicle 10). The first input 70 may include data such as GNSS data (e.g., GPS data), vehicle speed roadway curvature, and vehicle steering, and this data may be collected from the sensors 40 of the host vehicle 10 and/or other remote devices 48 through the communication system 36 of the host vehicle 10. The second input 72 may be received from the user tracker (e.g., eye tracker and/or head tracker). The system manager 68 is configured to determine (e.g., compute) the type, size, shape, and color of the conformal graphics (i.e., virtual images 50) based on the first input 70 (i.e., the vehicle location in space), the second input 72 (e.g., the position of the eyes and/or head of the user in the host vehicle 10), and the sensed vehicle driving environment (which may be obtained through the sensors 40). The type, size, shape, and color of the conformal graphics of the virtual image 50 may be collectively referred to as the virtual image characteristics.

With continued reference to FIG. 6, the system 98 further includes an image engine 74, which is part of the display 29, and may be an integrated circuit configured to generate the virtual images 50. These generated virtual images 50 are then projected on the windshield 39 (if the display 29 is a HUD) to show the virtual images 50 on the second image plane 60 along the roadway surface 62.

Figure 7:
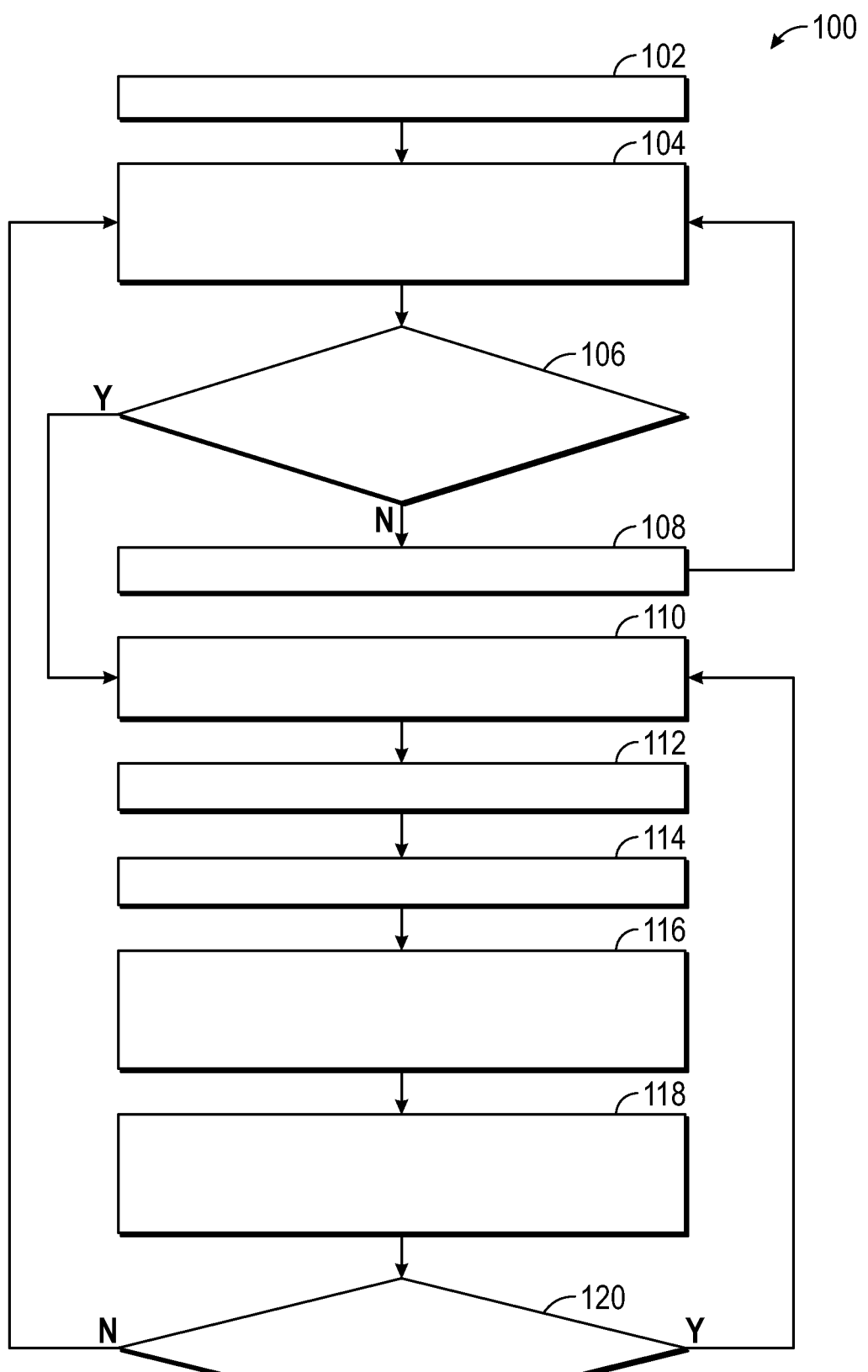
FIG. 7 is a flowchart of a method for a social networking using a multi-focal plane augmented reality display.

FIG. 7 is a flowchart of the method 100 for social networking using the display 29, such as the multi-focal plane augmented reality display 29a and/or the information display 29b. The method 100 begins at block 102, in which the controller 34 determines that the host vehicle 10 is being driven using, for example, signals generated by the sensors 40. For example, the controller 34 may receive data from one of the sensors 40, such as a speed sensor, to determine that the host vehicle 10 is moving. Then, the method 100 proceeds to block 104.

At block 104, the controller 34 receives social-networking data. As discussed above, the term "social networking" means the use of internet-based social media platforms to stay connected with friends, family, acquaintances, or peers or to find new connections having, for example, common social interests. The term "social-networking data" means data about social-networking and the remote users 49 engaged in social networking. In certain embodiments, the social-networking data includes information about at least one social interest of remote users 49 within the viewable area of the vehicle user 11 (FIG. 6) of the host vehicle 10 as well as data about the location, movements, trajectory, and/or destination of the remote users 49 engaged in social networking. As discussed above, the term "viewable area" means an area that is: (1) visible by the vehicle user 11 (FIG. 6) through a windshield 39 of the host vehicle 10 (FIG. 1); (2) in front of the host vehicle 10, and (3) within a predetermined viewable distance from the host vehicle 10. To obtain the social-networking data, the controller 34 may receive at least one signal from one or more sensors 40, such as cameras 41, GNSS transceivers 45 (e.g., Global Positioning System (GPS) transceivers), data from the Internet, roadway databases and/or data from the other remote devices 48, such as remote vehicles or remote mobile phones, via the communication transceivers 37 using, for example, V2V communication. Because the remote users 49 are in possession of remote devices 48, the controller 34 may determine the location, movements, and social interests of the remote users 49 within the viewable area of the vehicle user 11 of the host vehicle 10 using, for example, the social-networking data received from the GNSS transceiver 45, another sensor 40, or another suitable source of information, such as the remote devices 48. At block 104, the controller 34 may also determine the location of the host vehicle 10 relative to the remote devices 48 and/or the remote users 49 in possession of the remote devices 48 using at least one signal from one or more sensors 40, such as cameras 41, GNSS transceivers 45 (e.g., Global Positioning System (GPS) transceivers), data from the Internet, roadway databases and/or data from the other remote devices 48, such as remote vehicles or remote mobile phones, via the communication transceivers 37. The method 100 then proceeds to block 106.

At block 106, the controller 34 determines whether one or more social interests of the remote users 48 within the viewable area of the vehicle user 11 match one or more vehicle-user social interests of the vehicle user 11 using the social-networking data. The term "social interest" means an individual's awareness of belonging to a particular group. For example, a social interest may be that an individual belongs to a group that are fans of PINK FLOYD. In another example of a social interest, an individual may belong to a group that are HARVARD UNIVERSITY graduates. In yet another example of a social interest, an individual may belong to a group that are DETROIT TIGERS fans and are heading to a TIGERS baseball game. The term "vehicle-user social interest" means the social interest of the vehicle user 11. The vehicle user 11 may input his or her social interests (i.e., the vehicle-user social interests) into the controller 34 through the user interface 23 before operating the host vehicle 10. At block 106, if the social interests of the remote users 48 within the viewable area of the vehicle user 11 do not match any of the vehicle-user social interests, then the method 100 proceeds to block 108. At block 108, the controller 34 performs no action, and the method 100 then returns to block 104. If the social interests of one or more remote users 48 within the viewable area of the vehicle user 11 match one or more of the vehicle-user social interests, then the method 100 proceeds to block 110.

At block 110, the controller 34 determines the position (or location) of the host vehicle 10 relative to the remote users 49 having at least one social interest that matches the vehicle-user social interest. To do so, the controller 34 may use data received from GNSS transceiver 45 and/or roadway data, such as roadway databases. Stated differently, at block 110, the controller 34 determines where the host vehicle 10 is located with respect to the remote users 48 and/or the remote devices 48. Because the remote users 49 are in possession of remote devices 48, the controller 34 may determine the location of the remote users 49 relative to the location of the host vehicle 10 using, for example, data received from the GNSS transceiver 45, another sensor 40, or another suitable source of information, such as the remote devices 48. Then, the method 100 continues to block 112.

At block 112, the controller 34 determines the location of the eyes 66 and/or the head 69 of the user of the host vehicle 10 using at least one input from the user tracker 43. As discussed above, the user tracker 43 may be a camera 41 configured to track the movements of the head 69 and/or the eyes 66 of the vehicle user. The controller 34 then uses the inputs from the user tracker 43 to continuously determine, in real time, the location of the eyes 66 and/or the head 69 of the user of the host vehicle 10. The method 100 then proceeds to block 116.

At block 116, the controller 34 determines, in real time, the location, type, size, shape, and color of the virtual image 50 (FIG. 2) to be displayed on the display 29 (e.g., the multi-focal plane augmented reality display) based on the location of the eyes 66 and/or the head 69 of the user of the host vehicle 10, the social-networking data, and/or the location of the host vehicle 10 relative to the location of the remote users 49. As a non-limiting example, the location of the virtual image 50 in the display 29 may change as the vehicle user 11 moves the head 69 and/or eyes 66. Further, the size of the virtual images 50 may increase as the host vehicle 10 gets closer to the remote user 49 having at least one social interest that matches the vehicle-user social interests. Next, the method 100 proceeds to block 118.

At block 118, the controller 34 transmits a command signal to command the multi-focal plane augmented reality display 29a to present at least one virtual image 50 at the previously determined locations. As discussed above, the virtual image 50 is indicative that the vehicle-user social interest that matches the social interest of the remote user 49. Each virtual image 50 includes text, logo, slogan (e.g., DETROIT TIGERS logo, PINK FLOYD brand, and/or HARVARD logo), or other information indicative of the social interest of the particular remote user 49 that matches the vehicle-user social interest. The location of the virtual images 50 may change in real time based on location of the eyes 66 and/or the head 69 of the vehicle user. In response to receiving the command signal from the controller 34, the multi-focal plane augmented reality display 29a shows the virtual image 50 at the previously determined location with the previously determined size.

Also at block 118, the controller 34 transmits a command signal to the information display 29b to show the contact information 76 associated with each remote user 49 identified in the multi-focal plane augmented reality display 29a as having the same social interest as the vehicle user 11. To this end, the display 29b shows remote-user information 75 and the contact information 76 of the particular remote user 49 next to the remote-user information 75. The contact information 76 may be the page of the remote user 49 in a particular Internet-based social media platform, such as FACEBOOK, TWITTER, INSTAGRAM, WHATSAPP, and/or TIKTOK. The remote-user information 75 may include text identifying the remote user 49 having the same social interest as the vehicle user 11. For example, the remote-user information 75 may include text, such as "PINK FLOYD fan", "TIGER fan heading to the DODGER Stadium" and/or "HARVARD alumni '09". Then, the method 100 continues to block 120.

At block 120, the controller 34 determines whether the remote user 49 with at least one social interest of the remote user that matches the vehicle-user social interest is still within the viewable area of the vehicle user 11. To do so, the controller 34 determines: (1) whether the remote device 48 of the remote user 49 with at least one social interest of one or more remote users 49 that matches the vehicle-user social interest is within the predetermined viewable distance from the host vehicle 10; (2) whether the remote device 48 of the remote user 49 with at least one social interest that matches the vehicle-user social interest is in the area in front of the host vehicle 10; and (3) whether the remote device 48 and/or the remote user 49 with at least one social interest that matches the vehicle-user social interest is visible by the vehicle user 11 (FIG. 6) through a windshield 39 of the host vehicle 10. The controller 34 may use data from the user tracker 43, the social-networking data, and/or data from the sensors 40, such as the camera 41 to determine whether the remote user 49 with at least one social interest of the remote user that matches the vehicle-user social interest is still within the viewable area of the vehicle user 11. If the remote user 49 with at least one social interest of the remote user 49 that matches the vehicle-user social interest is still within the viewable area of the vehicle user 11, then the method 100 returns to block 110. If the remote user 49 with at least one social interest of the remote users 49 that matches the vehicle-user social interest is not within the viewable area of the vehicle user 11, then controller 34 commands the information display 29b and the multi-focal plane augmented reality display 29a to stop presenting the information and virtual images 50, respectively, of the remote users 49 that are no longer within the viewable area of the vehicle user 11 and the method 100 returns to block 104. In other words, the controller 34 transmits an off signal to the multi-focal plane augmented reality display 29a to discontinue showing the virtual image 50 on the multi-focal plane augmented reality display 29a. The controller 34 also transmits an off signal to the information display 29b to stop showing the contact information 76 of the remote users 49 that are no longer within the viewable area of the vehicle user 11.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for social networking using a multi-focal plane augmented reality display of a host vehicle, comprising:
   receiving social-networking data from a remote device, wherein the social-networking data includes information about at least one social interest of a remote user of the remote device, the remote device is located within a viewable area of a vehicle user of the host vehicle, and the viewable area is an area that is visible by the vehicle user through a windshield of the host vehicle, in front of the host vehicle, and within a predetermined viewable distance from the host vehicle;
   determining whether the at least one social interest of the remote user matches a vehicle-user social interest of the vehicle user of the host vehicle using the social-networking data;
   in response to determining that the at least one social interest of the remote user matches the vehicle-user social interest of the vehicle user, transmitting a command signal to the multi-focal plane augmented reality display of the host vehicle to display a virtual image on the multi-focal plane augmented reality display, wherein the virtual image is indicative of the vehicle-user social interest that matches the at least one social interest of the remote user;
   determining whether the remote user with the at least one social interest that matches the vehicle-user social interest is still within the viewable area of the vehicle user after transmitting the command signal to the multi-focal plane augmented reality display of the host vehicle to display the virtual image on the multi-focal plane augmented reality display;
   wherein determining whether the remote user with the at least one social interest that matches the vehicle-user social interest is still within the viewable area of the vehicle user includes:
   determining whether the remote device of the remote user with the at least one social interest that matches the vehicle-user social interest is both within the predetermined viewable distance from the host vehicle and in the area in front of the host vehicle; and
   in response to determining that the remote user with the at least one social interest that matches the vehicle-user social interest is not within the viewable area of the vehicle user, transmitting an off signal to the multi-focal plane augmented reality display to discontinue showing the virtual image on the multi-focal plane augmented reality display.

2. The method of claim 1, further comprising determining a location of the host vehicle relative to the remote user having the at least one social interest of the remote user that matches the vehicle-user social interest.

3. The method of claim 2, further comprising determining a type of the virtual image to be displayed by the multi-focal plane augmented reality display based on the at least one social interest that matches the vehicle-user social interest.

4. The method of claim 3, further comprising:
   determining a location of eyes of the vehicle user of the host vehicle; and
   determining a location of the virtual image based on the location of the eyes of the vehicle user;
   wherein transmitting the command signal to the multi-focal plane augmented reality display includes commanding the multi-focal plane augmented reality display of the host vehicle to display the virtual image at the location determined based on the location of the eyes of the vehicle user.

5. The method of claim 3, further comprising:
   determining a location of eyes of the vehicle user of the host vehicle;
   determining a location of a head of the vehicle user of the host vehicle; and
   determining a location of the virtual image based on the location of the eyes of the vehicle user and the location of the head of the host vehicle;
   wherein transmitting the command signal to the multi-focal plane augmented reality display includes commanding the multi-focal plane augmented reality display of the host vehicle to display the virtual image at the location determined based on the location of the eyes and the location of the head of the vehicle user.

6. The method of claim 5, wherein the multi-focal plane augmented reality display is configured as a head-up display, and the virtual image is displayed on the windshield of the host vehicle.

7. The method of claim 6, wherein the host vehicle includes an information display, and the method further comprises displaying contact information for the remote user with the at least one social interest that matches the vehicle-user social interest.

8. The method of claim 1, further comprising: in response to determining that the remote device of the remote user with the at least one social interest that matches the vehicle-user social interest is not within the predetermined viewable distance from the host vehicle or that the remote device of the remote user with the at least one social interest that matches the vehicle-user social interest is not in the area in front of the host vehicle, determining that the remote user with the at least one social interest that matches the vehicle-user social interest is not within the viewable area of the vehicle user.

9. A system for social networking in a multi-focal plane augmented reality display of a host vehicle, comprising:
a transceiver configured to receive social-networking data from a remote device, wherein the social-networking data includes information about at least one social interest of a remote user of the remote device, the remote device is located in a viewable area of a vehicle user of the host vehicle, and the viewable area is an area that is visible by the vehicle user through a windshield of the host vehicle, in front of the host vehicle, and within a predetermined viewable distance from the host vehicle; a multi-focal plane augmented reality display configured to display a virtual image; a controller in communication with the transceiver and the multi-focal plane augmented reality display, wherein the controller is configured to: receive the social-networking data from the remote device; determine whether the at least one social interest matches a vehicle-user social interest of the vehicle user of the host vehicle; in response to determining that the at least one social interest of the remote device matches the vehicle-user social interest of the vehicle user, transmit a command signal to the multi-focal plane augmented reality display of the host vehicle to display a virtual image on the multi-focal plane augmented reality display, wherein the virtual image is indicative of the vehicle-user social interest that matches the at least one social interest of the remote device;
determine whether the remote user with the at least one social interest that matches the vehicle-user social interest is still within the viewable area of the vehicle user after transmitting the command signal to the multi-focal plane augmented reality display of the host vehicle to display the virtual image on the multi-focal plane augmented reality display;
wherein the controller is configured to determine whether the remote user with the at least one social interest that matches the vehicle-user social interest is still within the viewable area of the vehicle user by:
determining whether the remote device of the remote user with the at least one social interest of the remote user that matches the vehicle-user social interest is both within the predetermined viewable distance from the host vehicle and is in the area in front of the host vehicle; and
in response to determining that the remote user with the at least one social interest that matches the vehicle-user social interest is not within the viewable area of the vehicle user, transmit an off signal to the multi-focal plane augmented reality display to discontinue showing the virtual image on the multi-focal plane augmented reality display.

10. The system of claim 9, further comprising a plurality of sensors in communication with the controller, wherein the controller is further configured to determine a location of the host vehicle relative to the remote device having the at least one social interest that matches the vehicle-user social interest based on at least one signal received from the plurality of sensors.

11. The system of claim 10, wherein the controller is configured to determine a type of the virtual image to be displayed by the multi-focal plane augmented reality display based on the at least one social interest that matches the vehicle-user social interest.

12. The system of claim 11, wherein the plurality of sensors includes a user tracker in communication with the controller, and the controller is configured to:
determine a location of eyes of the vehicle user of the host vehicle based on an input from the user tracker;
determine a location of the virtual image based on the location of the eyes of the vehicle user; and
command the multi-focal plane augmented reality display of the host vehicle to display the virtual image at the location determined based on the location of the eyes of the vehicle user.

13. The system of claim 11, wherein the plurality of sensors includes a user tracker in communication with the controller, and the controller is configured to:
determine a location of eyes of the vehicle user of the host vehicle based on an input from the user tracker;
determine a location of a head of the vehicle user of the host vehicle based on the input from the user tracker;
determine a location of the virtual image based on the location of the eyes of the vehicle user and the location of the head of the host vehicle; and
command the multi-focal plane augmented reality display of the host vehicle to display the virtual image at the location determined based on the location of the eyes and the location of the head of the vehicle user.

14. The system of claim 13, wherein the multi-focal plane augmented reality display is configured as a head-up display, and the controller is configured to command the multi-focal plane augmented reality display to display the virtual image on the windshield of the host vehicle.

15. The system of claim 14, wherein the host vehicle includes an information display in communication with the controller, and the controller is further configured to command the information display to display contact information for the remote user with the at least one social interest that matches the vehicle-user social interest.

16. The system of claim 9, wherein the controller is configured to: in response to determining that the remote device of the remote user with the at least one social interest of the remote user that matches the vehicle-user social interest is not within the predetermined viewable distance from the host vehicle or that the remote device of the remote user with the at least one social interest that matches the vehicle-user social interest is not in the area in front of the host vehicle, determine that the remote user with the at least one social interest that matches the vehicle-user social interest is not within the viewable area of the vehicle user.

\* \* \* \* \*